United States Patent [19]

Enoki et al.

[11] Patent Number: 5,390,365
[45] Date of Patent: Feb. 14, 1995

[54] RADIO COMMUNICATION APPARATUS HAVING A RECEIVED SIGNAL STRENGTH MEASURING FUNCTION

[75] Inventors: Masayuki Enoki; Arata Obayashi, both of Tokyo, Japan

[73] Assignee: Kabushiki Kaisha Toshiba, Kanagawa, Japan

[21] Appl. No.: 885,973

[22] Filed: May 20, 1992

[30] Foreign Application Priority Data

May 20, 1991 [JP] Japan ................... 3-114923

[51] Int. Cl.6 .................... H04B 7/00; H04B 17/00
[52] U.S. Cl. ................... 455/54.1; 455/33.1; 455/226.2; 455/226.4
[58] Field of Search ............ 455/33.1, 33.2, 54.1, 455/67.1, 69, 226.1, 226.2, 67.3, 74, 127, 226.4, 56.1, 63, 89, 186.1; 379/60, 58, 59; 375/7

[56] References Cited

U.S. PATENT DOCUMENTS

| | | | |
|---|---|---|---|
| 4,619,002 | 10/1986 | Thro | 455/226.2 |
| 5,008,953 | 4/1991 | Dahlin et al. | 455/33.1 |
| 5,129,098 | 7/1992 | McGirr et al. | 455/127 |
| 5,152,009 | 9/1992 | Sato | 455/226.1 |
| 5,228,074 | 7/1993 | Mizikovsky | 455/33.1 |

FOREIGN PATENT DOCUMENTS 9014730  11/1990  WIPO ..................... 379/58

*Primary Examiner*—Curtis Kuntz
*Assistant Examiner*—Nguyen Vo
*Attorney, Agent, or Firm*—Banner, Birch, McKee & Beckett

[57] ABSTRACT

A dual mode cellular radio communication apparatus having a received signal strength measuring function is disclosed. The measured strength of the signal may be corrected when the apparatus operates in the digital mode. The value of corrected strength may be used for indicating the received signal strength to a user of the apparatus and for reporting the received signal strength to a base station. Similarly, the measured strength of the signal may be corrected for indicating the received signal strength to a user of the apparatus when the apparatus operates in the analog mode.

6 Claims, 7 Drawing Sheets

FIG. 5

| POINT | INPUT LEVEL |
|---|---|
| $P_1$ | $L_1$ |
| $P_2$ | $L_2$ |
| $P_3$ | $L_3$ |
| $P_4$ | $L_4$ |
| $P_5$ | $L_5$ |
| $P_6$ | $L_6$ |
| $P_7$ | $L_7$ |
| $P_8$ | $L_8$ |
| $P_9$ | $L_9$ |

FIG. 6

| POINT | R.S.S.I. DATA |
|---|---|
| $P_1$ | $RD_1$ |
| $P_2$ | $RD_2$ |
| $P_3$ | $RD_3$ |
| $P_4$ | $RD_4$ |
| $P_5$ | $RD_5$ |
| $P_6$ | $RD_6$ |
| $P_7$ | $RD_7$ |
| $P_8$ | $RD_8$ |
| $P_9$ | $RD_9$ |

RADIO COMMUNICATION APPARATUS HAVING A RECEIVED SIGNAL STRENGTH MEASURING FUNCTION

This application is related by subject matter to copending U.S. application Ser. No. 07/800,426 entitled DUAL MODE CELLULAR RADIO COMMUNICATION APPARATUS HAVING AN ECHO CANCELLER EMPLOYED IN BOTH ANALOG AND DIGITAL MODES filed on Nov. 27, 1991 and incorporated herein by reference thereto.

BACKGROUND OF THE INVENTION

1. Field of the Invention

The present invention relates to the field of radio communication apparatus such as mobile telephones, portable telephones, cordless telephones, and the like. More specifically, the present invention relates to a radio mobile unit used in a radio communication system in which the strength of a received signal is measured by the mobile unit.

2. Description of the Related Art

As the number of subscribers in cellular radio systems increase, it is desirable to incorporate digital signal transmission methods into the analog cellular system that are presently available in order to transmit speech signals at a more efficient transmission rate. A system of this type is called a Dual Mode Cellular System. In such a system, speech signals may be selectively transmitted between a base station and a mobile unit over speech radio links in either analog or digital mode. In the analog mode transmission, the speech signals are modulated by an analog modulation method, for example, by frequency modulation (FM).

In the digital mode transmission, the speech signals are encoded into digital signals and transmitted at a more efficient transmission rate. Still, in the digital mode, speech communication links may be established by the time division multiple access (TDMA) method between a mobile unit and a base unit. In the TDMA, signals to be transmitted to a particular mobile unit are transmitted in designated time slots of a radio channel. The technical standard for the dual mode cellular system is specified in "Dual-Mode Mobile Station-Base Station Compatibility Standard" published by the EIA (Electronic Industries Association) as IS-54.

In a dual mode mobile unit served by such a dual mode cellular system, a received signal strength indicator may be employed as has been employed in a conventional analog-only mobile unit. If a received signal strength measuring circuit device which is common to both of the digital and analog mode transmission is used, the way in which the device measures the signal strength in the digital mode is the same as that in the analog mode.

A deficiency of such a dual mode mobile unit is in that the signal strength measured by the unit varies depending on whether the unit operates in the analog mode or in the digital mode even if the unit is located in a position where it is a certain distance away from a base station. This is because the signals are received continuously in the analog mode while the signals are received intermittently in the digital mode owing to the TDMA method adopted in the digital mode. Therefore, even if the strength of received signals in the analog mode were substantially the same as that in the digital mode, an average value of the strength of signals measured in the digital mode is lower than that measured in the analog mode.

Another problem is that more accurate received signal strength information is required to be transmitted to a base station serving the mobile unit, in accordance with the technical standard. Specifically, the received signal strength information has to be included in the MAHO (Mobile Assisted Handoff) control signal which is defined in the technical standard. The MAHO control signal is transmitted to the base station in the digital mode operation. However, the received signal strength indicator employed in the conventional analog-only mobile unit, which consists of an integrated circuit device, is not capable of accurately measuring the received signal strength. This is because the integrated circuit device individually has measurement characteristics of its own when the device measures the received signal strength.

SUMMARY OF THE INVENTION

It is accordingly an object of the present invention to provide a radio communication apparatus wherein received signal strength may be accurately corrected.

It is another object of the present invention to provide a cellular communication apparatus in which an accurate indication of the signal strength of signals received by the apparatus may be provided.

It is still another object of the present invention to provide a dual mode radio cellular communication apparatus capable of appropriately measuring the signal strength of signals received by the apparatus regardless of its operational mode.

It is still another object of the present invention to provide a dual mode cellular communication apparatus in which an appropriate value of the signal strength of signals received by the apparatus may be reported to a base station.

To achieve one or more of the objects, as embodied and described herein, the radio communication apparatus according to one aspect of the present invention, which is used in a dual mode cellular radio system wherein speech signals are selectively transmitted in an analog mode or a digital mode over a radio link established between a base station and the radio communication apparatus, comprises a receiver for receiving radio frequency signals transmitted over the radio link, a measurement device, coupled to the receiver, for measuring the strength of the radio frequency signals received by the receiver and outputting an output signal corresponding to the measured strength of the radio frequency signals, and a controller for performing a correction operation on the output signal when the apparatus operates in the digital mode.

The measurement device may output a digital signal corresponding to the measured strength of the radio frequency signals and the controller may comprise one or more memories for storing conversion data and a microprocessor for calculating a corrected input level on the basis of the digital signal and the conversion data.

The apparatus may further comprise a display unit for displaying the received signal strength on the basis of a corrected output signal which is output from the controller when the apparatus operates in the digital mode, and on the basis of the output signal which is output from the measurement device when the apparatus operates in the analog mode.

The apparatus may further comprise a transmitter coupled to the controller for transmitting a control signal, including a corrected output signal which is output from the controller, when the apparatus operates in the digital mode.

The radio communication apparatus according to another aspect of the present invention, which is used in a dual mode cellular radio system wherein speech signals are selectively transmitted in an analog mode or a digital mode over a radio link established between a base station and the radio communication apparatus, comprises a receiver for receiving radio frequency signals transmitted over the radio link, a measurement device coupled to the receiver for measuring the strength of the radio frequency signals received by the receiver and outputting an output signal corresponding to the measured strength of the radio frequency signals, a first memory for storing first conversion data for digital mode signals, a second memory for storing second conversion data for analog mode signals, and a microprocessor coupled to the measurement device and selectively coupled to either of the first memory or the second memory for calculating a corrected received signal strength on the basis of the output signal and the first conversion data when the apparatus operates in the digital mode, and for calculating a corrected received signal strength on the basis of the output signal and the second conversion data when the apparatus operates in the analog mode.

The radio communication apparatus according to still another aspect of the present invention, which is used in a cellular radio system wherein speech signals are transmitted over a radio link established between a base station and the radio communication apparatus, comprises a receiver for receiving radio frequency signals transmitted over the radio link, a measurement device having individual measurement characteristics, and coupled to the receiver, for measuring the strength of the radio frequency signals received by the receiver and outputting an output signal corresponding to the measured strength of the radio frequency signals, a memory for storing conversion data which are stored in accordance with the individual measurement characteristics of the measurement device, and a microprocessor, coupled to the measurement device and the memory, for calculating a corrected received signal strength on the basis of the output signal and the conversion data.

BRIEF DESCRIPTION OF THE DRAWINGS

FIG. 5 shows the conversion data prestored in ROM 23 shown in FIG. 3.

FIG. 6 shows the conversion data prestored in RAM 24 shown in FIG. 3.

DETAILED DESCRIPTION OF THE PREFERRED EMBODIMENTS

Figure 1:
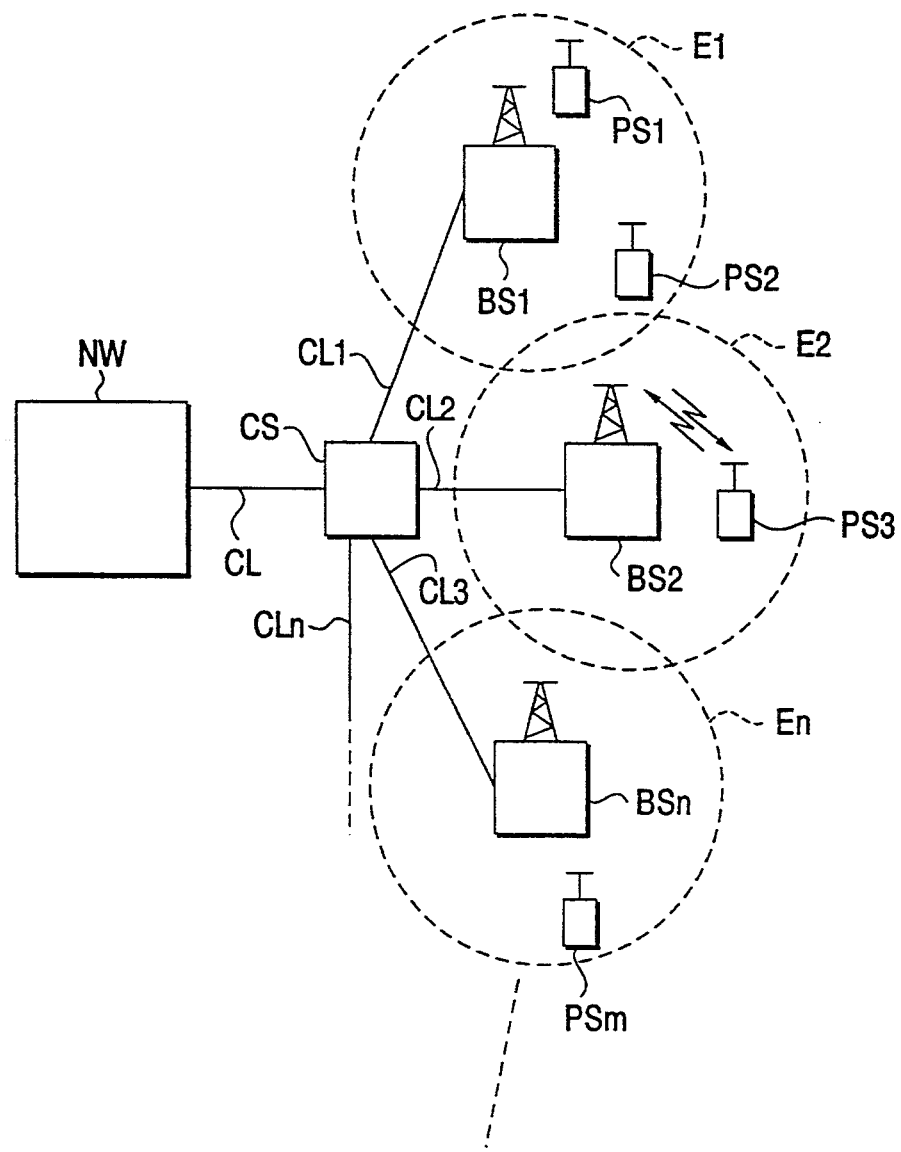
FIG. 1 is a schematic diagram showing the arrangement of a dual mode type radio telephone system in which a dual mode cellular mobile unit according to one embodiment of the present invention operates.

FIG. 1 is a schematic diagram showing the arrangement of a dual mode type radio telephone system in which a dual mode cellular mobile unit according to one embodiment of the present invention operates. The dual mode type radio telephone system comprises a control station CS connected to a wired telephone network NW, a plurality of base stations BS1-BSn connected to the control station CS via respective cable lines CL1-CLn, and a plurality of mobile units PS1-PSm. The base stations BS1-BSn are located in radio zones E1-En, each of which is called a cell. Each of the mobile units PS1-PSm may be connected via radio links to a base station in the radio zone where it is located. The base station is further connected to the wired telephone network NW via the control station CS from the base station. Thus, the mobile units may communicate with telephones connected to the wired telephone network. When a mobile unit moves to an adjoining radio zone in the event that a speech communication link has been established between the mobile unit and a base station, the control station CS performs control to switch the radio channels to those of the base station in the adjoining radio zone so that a user may keep talking over the switched radio link. The control operation is called a handoff.

Figure 2:
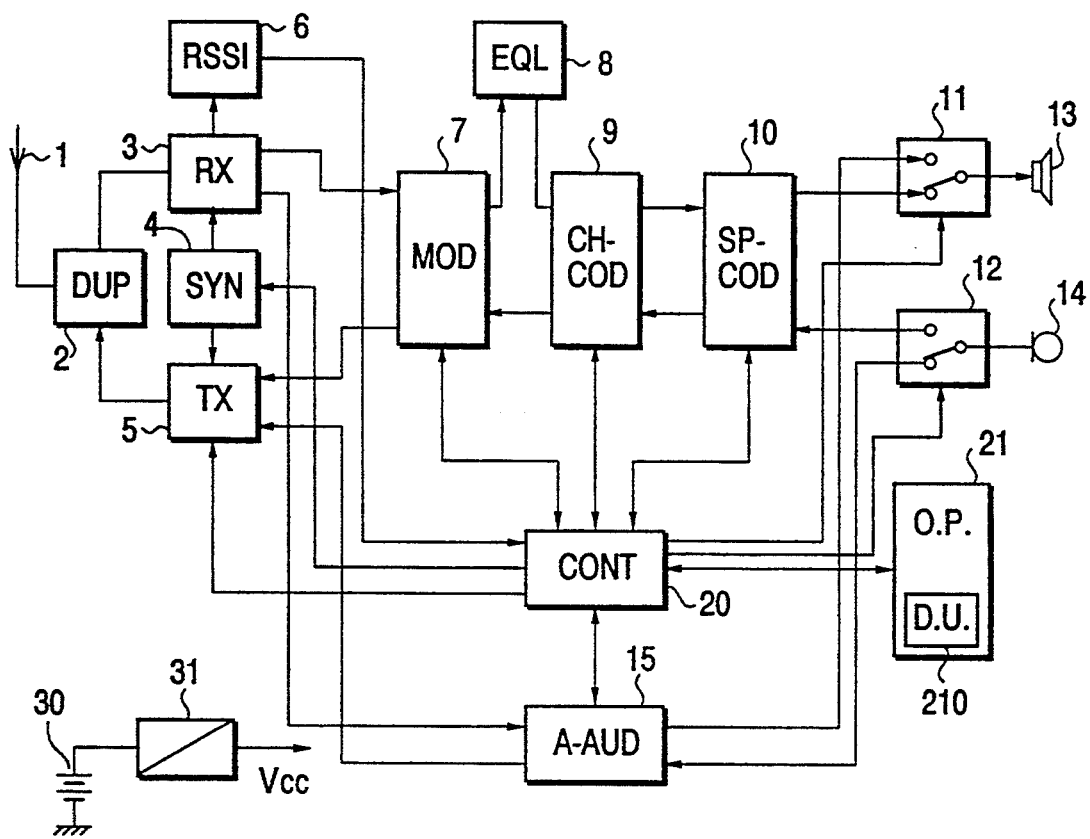
FIG. 2 is a block diagram of the mobile unit according to an embodiment of the present invention.

FIG. 2 is a block diagram of the mobile unit according to an embodiment of the present invention. The dual mode cellular telephone has two operational modes. One mode is an analog mode, and the other mode is a digital mode.

Referring to FIG. 2, radio frequency (RF) signals are received at an antenna 1 and applied to a receiving circuit (RX) 3 through a duplexer (DUP) 2. In the RX 3, the RF signals which are within a frequency range of 800–900 MHz are frequency demodulated into intermediate frequency (IF) signals by local oscillation signals from a synthesizer (SYN)4. A received signal strength indicator (RSSI) 6 measures the signal strength of received signals. This measurement may be implemented by a plurality of diodes which are connected to each output of plural stage of amplifiers as shown and described in U.S. Pat. No. 4,996,715 (incorporated herein by reference thereto). A magnitude of voltage corresponding to the measured signal strength is sent to a controller (CONT) 20 through an analog/digital (A/D) converter 18.

In the digital mode, radio frequency signals received at antenna 1 are applied to RX 3 through DUP 2. In RX 3, the radio frequency signals are converted into intermediate frequency (IF) signals by local oscillation signals from a synthesizer 4. The IF signals are demodulated after frame and bit synchronization signals are acquired in digital modulator/demodulator (MOD) 7. The acquired synchronization signals are sent to CONT 20. MOD 7 extracts digital control signals out of the demodulated signals and sends the digital control signals to CONT 20. Digital speech signals included in the demodulated signals are applied to an equalizer (EQL)8. Signal equalization of the demodulated signals is performed therein. The output of EQL 8 is coupled to an error correction coder/decoder (CH-COD) 9.

CD-COD 9 deinterleaves the applied signals, performs error detection and correction on the deinterleaved signals by using a Cyclic Redundancy Check (CRC) technique and a convolutional coding technique. The output of CH-COD 9 is coupled to a speech coder/decoder (SP-COD) 10. In SP-COD 10, the applied digital speech signals are decoded using a prescribed decoding technique and converted into analog speech signals. The analog speech signals are converted into acoustic signals and output from speaker 13.

Speech signals from microphone 14 are reversely processed by SP-COD 10, CH-COD 9, and MOD 7 and transmitted by a transmitter (TX) 5 through DUP 2 and antenna 1.

In the analog mode, an analog audio circuit (A-AUD) 15 converts the demodulated signals output from RX 3 into analog speech signals and applies the analog speech signals to speaker 13. Also, A-AUD 15 converts speech signals applied from microphone 14 into IF signals and inputs the speech signals to TX 5.

Operational panel (OP) 21 having a display unit 210 is provided for entering a telephone dial number, a call origination command, etc. Power supply 31 consists of a battery 30 to supply each section of the telephone with electric power.

Then, a switch 11 and a switch 12 are provided to switch over the operational mode between two modes: an analog mode and a digital mode under the control of CONT 20. In the digital mode, switch 11 connects the output of SP-COD 10 to speaker 13 and switch 12 connects microphone 14 to this input of SP-COD 10. In the analog mode, switch 11 connects the output of an analog audio circuit (A-AUD) 15 to a speaker 13, and switch 12 connects microphone 14 to the input of A-AUD 15.

Figure 3:
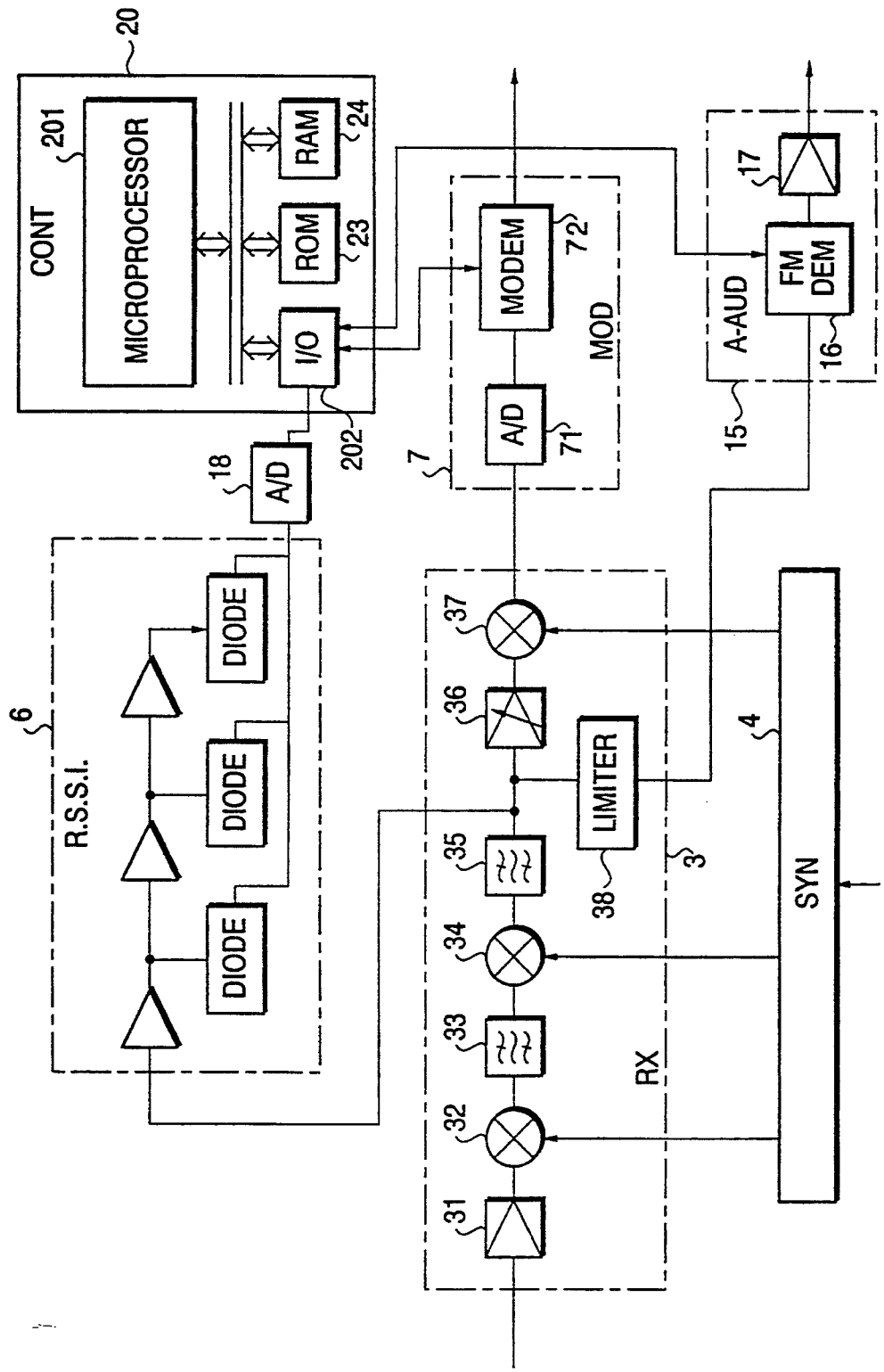
FIG. 3 is a detailed block diagram of the RX 3, RSSI 6, MOD 7, and CONT 20 shown in FIG. 2.

FIG. 3 is a detailed block diagram of the RX 3, RSSI 6, MOD 7, and CONT 20 shown in FIG. 2.

The RF signals are amplified in an amplifier 31. The amplified RF signals which are within a frequency range of 800-900 MHz are mixed with a first local oscillation signal from synthesizer 4 in a first mixer 32 and pass through a first band pass filter 33. The output signals of the first band pass filter 33 are signals of frequency range of 84 MHz (first IF signals). Similarly, the first IF signals are mixed with a second local oscillation signal from synthesizer 4 in a second mixer 34 and pass through a second filter 35. The output signals of the second band pass filter 35 are signals of frequency range of 450 KHz (second IF signals). In either of the analog mode or the digital mode, the received signals are demodulated into the second IF signals in the same way.

In the digital mode, the second IF signals are applied to an amplifier 36 in which the second IF signals are variably amplified. In other words, the gain of amplifier 36 is automatically controlled by a feedback loop. The second IF signals are mixed with a third local oscillation signal from synthesizer 4 in a third mixer 37 and converted into signals of frequency range of 60 KHz. The output of third mixer 37 is coupled to an analog/digital (A/D) converter 71 in MOD 7. The A/D converter 71 converts the third IF signals into the digital signals. The digital signals are subject to bit synchronization and frame synchronization processing in a MODEM portion 72 of MOD 7 as described above. The output signals of MODEM portion 72 are coupled to EQL 8 as described above in reference to FIG. 2.

In the analog mode, the second IF signals are transmitted to a limiter 38. Limiter 38 may pass digital control signals and analog speech signals but not digital speech signals. The output signals of limiter 38 are applied to a frequency modulation demodulator (FM-DEM) 16 in A-AUD 15 shown in FIG. 2. FM-DEM 16 demodulates the applied signals. The output signals of FM-DEM 16 are amplified by a low frequency amplifier 17, and applied to speaker 13 through switch 11.

The second IF signals are also applied to RSSI 6. RSSI 6 outputs an amplitude of voltage corresponding to the second IF signals. The amplitude of voltage is converted into a digital signal in an analog/digital (A/D) converter 18. The output of A/D converter 18 sends the digital signal corresponding to the received signal strength to CONT 20.

CONT 20 comprises a microprocessor 201, an I/O interface 202, a ROM 23, and a RAM 24. CONT 20 controls various operations of the apparatus such as establishment of radio links. Microprocessor 201 determines the mode of the apparatus, either the analog mode or the digital mode, on the basis of a mode designation signal included in the control signals which are transmitted from a base station and which also designate the speech channel. When the mobile unit receives a mode designation signal over a control channel, a speech radio link is established for transmission of the speech signals, and microprocessor 201 performs certain correction operations against the digital signals representative of the received signal strength which are applied from A/D converter 18.

Figure 4:
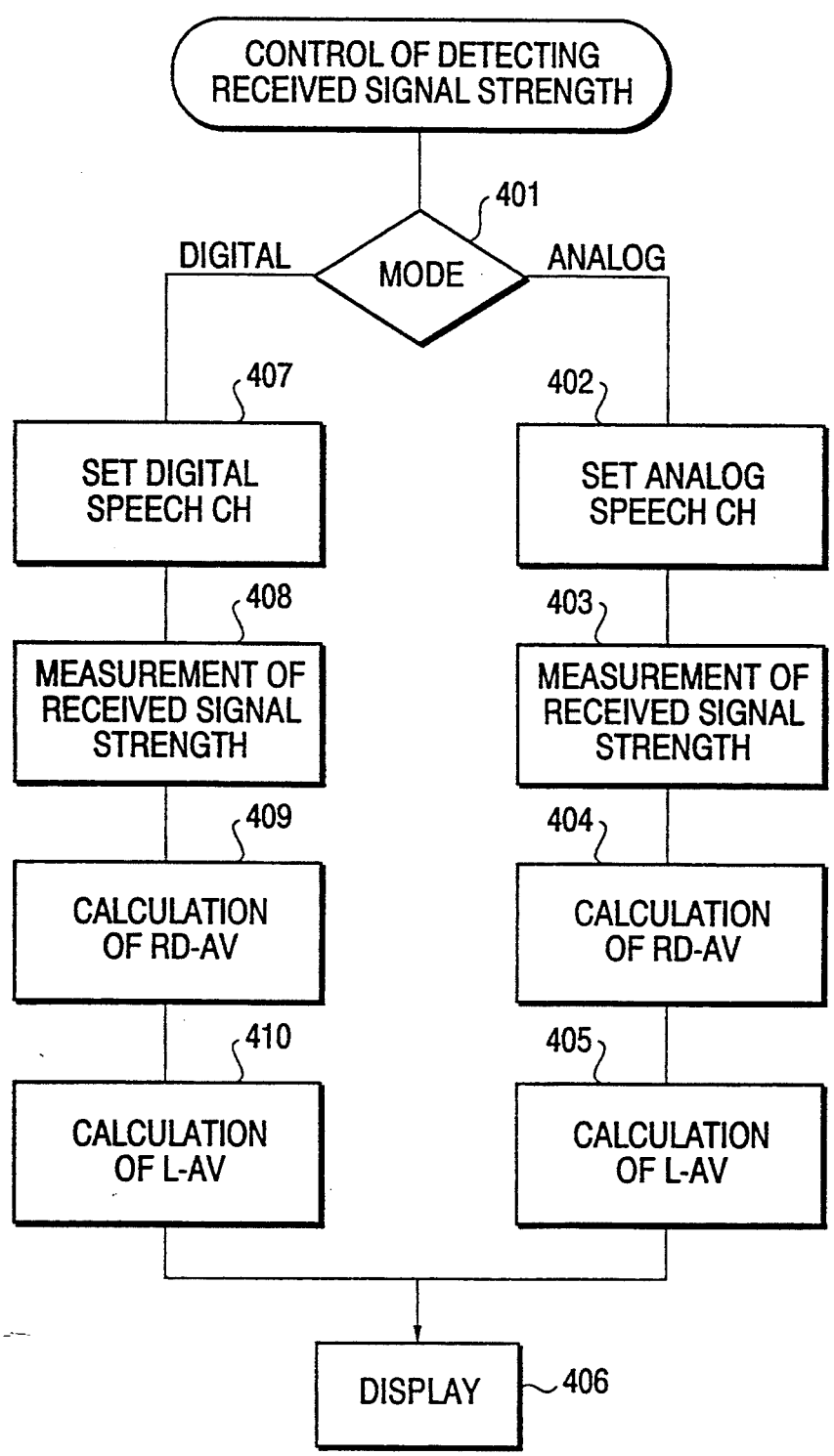
FIG. 4 is a flow chart for explaining a received signal strength indicator operation of the apparatus in accordance with an embodiment of the present invention.

FIG. 4 is a flow chart for explaining a received signal strength indicator operation of the apparatus in accordance with an embodiment of the present invention.

First, on the basis of the mode designation signal included in the control signals, the apparatus determines whether an analog mode or a digital mode is designated (STEP 401).

When the apparatus receives an analog mode designation signal, the apparatus tunes to an analog speech channel designated by a speech channel designation signal which is transmitted with the analog mode designation signal (step 402). The strength of the signals which are received through the analog speech channel is measured by RSSI 6 (step 403). The output signal of RSSI 6 is converted into a digital signal indicative of the signal strength. The digital signal is applied to microprocessor 201 in CONT 20 via I/O interface 202.

Microprocessor 201 stores fifty samples of the digital signal indicative of the signal strength. Then, microprocessor 201 calculates an average value: RD-av of the fifty samples of digital signal (step 404), and calculates a corrected input level: L-av on the basis of the average value: RD-av and conversion data which are prestored in ROM 23 and a first portion of RAM 24 (step 405). Details of the calculation will be described hereinafter. Upon completion of the calculation, microprocessor 201 controls display unit 210 so that the signal strength indication corresponding to the corrected input level: L-av is made (step 406).

When the apparatus receives a digital mode designation signal, the apparatus tunes to a digital speech channel designated by a speech channel designation signal which is transmitted with the digital mode designation signal (step 407). The strength of the signals which are received through the digital speech channel is measured by RSSI 6 (step 408). The output signal of RSSI 6 is converted into a digital signal indicative of the signal strength. The digital signal is applied to microprocessor 201 in CONT 20 via I/O interface 202.

Microprocessor 201 stores fifty samples of the digital signal indicative of the signal strength which are obtained from fifty TDMA slots assigned to the apparatus. Then, microprocessor 201 calculates an average value: RD-av of the fifty samples of digital signal (step 409) and calculates a corrected input level: L-av on the basis of the average value: RD-av and conversion data which are prestored in ROM 23 and a first portion of RAM 24 (step 410). Details of the calculation will be described hereinafter. Upon completion of the calculation, microprocessor 201 controls display unit 210 so that the signal strength indication corresponding to the corrected input level: L-av is made (step 406).

FIG. 5 shows the conversion data prestored in ROM 23. When the apparatus is assembled, the ROM 23 storing the conversion data is incorporated into the apparatus. In ROM 23, values of nine input levels: L1–L9 corresponding to nine points: P1–P9 are stored. In this instance, the input level means a signal level (strength) of signals which are substantially applied to RX 3.

FIG. 6 shows the conversion data prestored in RAM 24 which is preferably an EEPROM. After the apparatus is assembled in a factory, the conversion data are entered into RAM 24 in its data entry mode operation. In the operation, nine input levels: L1–L9, which are defined in ROM 23, of radio frequency signals are applied to RX 3, in either of the digital mode and analog mode transmission, by using a simulator device. Resultant outputs of A/D converter 18 are stored into the first portion for the digital mode signals and the second portion for analog mode signal in RAM 24 as RSSI data: RD1-9. Thus, ROM 23 and RAM 24 storing the conversion data constitute a conversion table for converting the actually measured signal strength to an appropriate input level. Accordingly, the conversion data of the conversion table is in accordance with the individual measurement characteristics of the RSSI 6.

Figure 7:
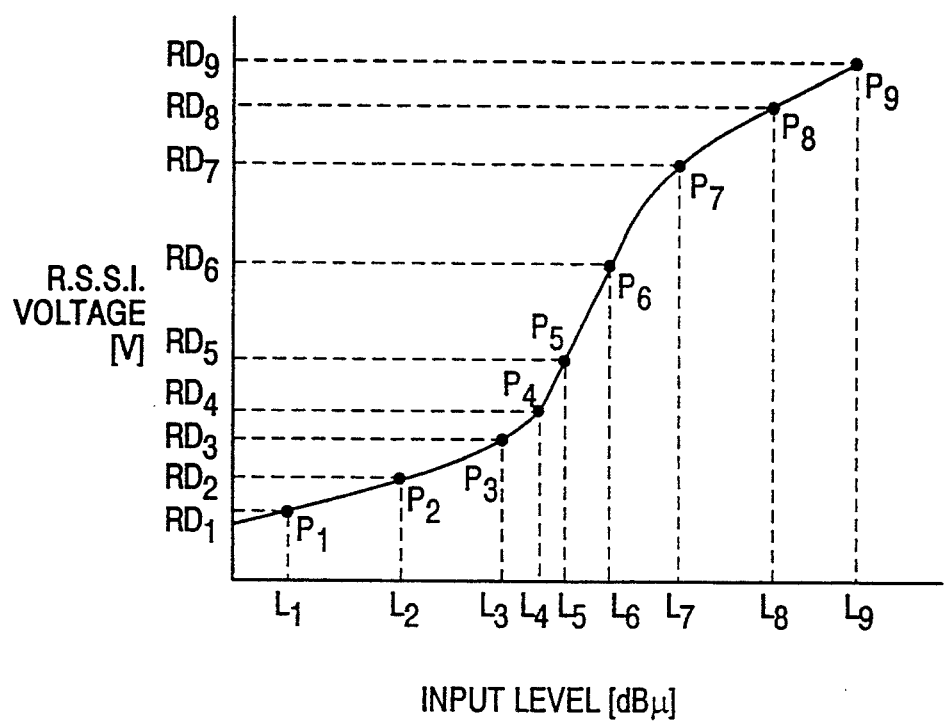
FIG. 7 shows the relationship between the input levels and the resultant signal strength measured by RSSI 6 shown in FIG. 3.

FIG. 7 shows the relationship between the input levels: L1–L9 and the resultant signal strength measured by RSSI 6 (which is output of RSSI 6). As appreciated from FIG. 7, the relationship is not linear due to the measurement characteristic of an integrated circuit device constituting RSSI 6. That is why correction operation on the actually measured signal strength, which is one aspect of the present invention, is necessary.

Figure 8:
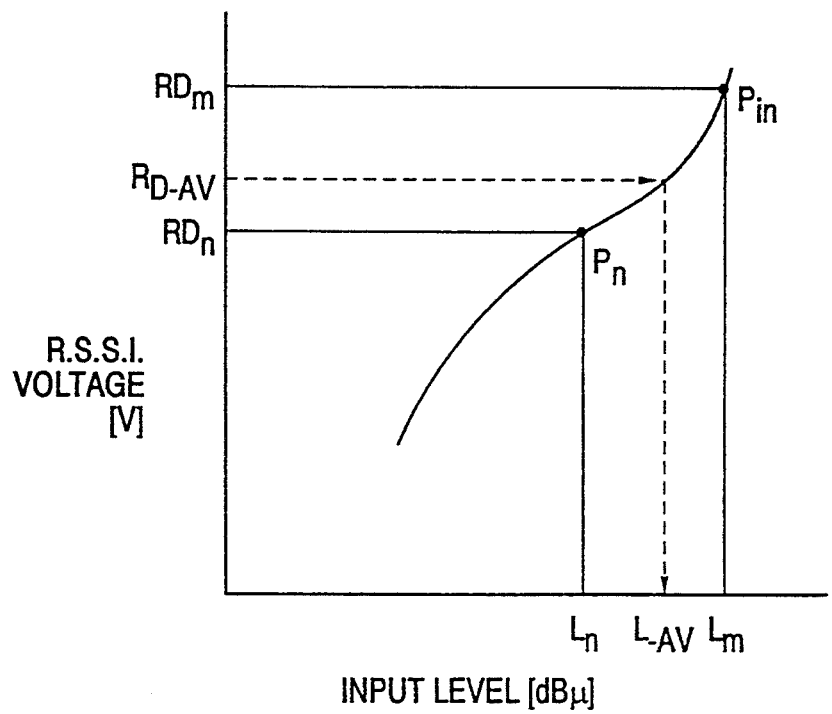
FIG. 8 in a diagram for explaining the calculation of L-av.

Returning to step 405 and 410 in FIG. 4, L-av may be calculated as follows. FIG. 8 is a diagram for explaining the calculation of L-av. On the basis of calculation result of RD-av, microprocessor 201 determines RDm and RDn between which the RD-av is positioned by referring to the table stored in the first portion or the second portion of RAM 24. Next, on the basis of the points Pm and Pn corresponding to the RDm and RDn, microprocessor 201 determines Lm and Ln by referring to the table stored in ROM 23. Then, microprocessor 201 calculates L-av in accordance with the following equation.

$$L\text{-}av = Ln + (Lm-Ln)*(RD\text{-}av-RDm)/(RDm-RDn)$$

Figure 9:
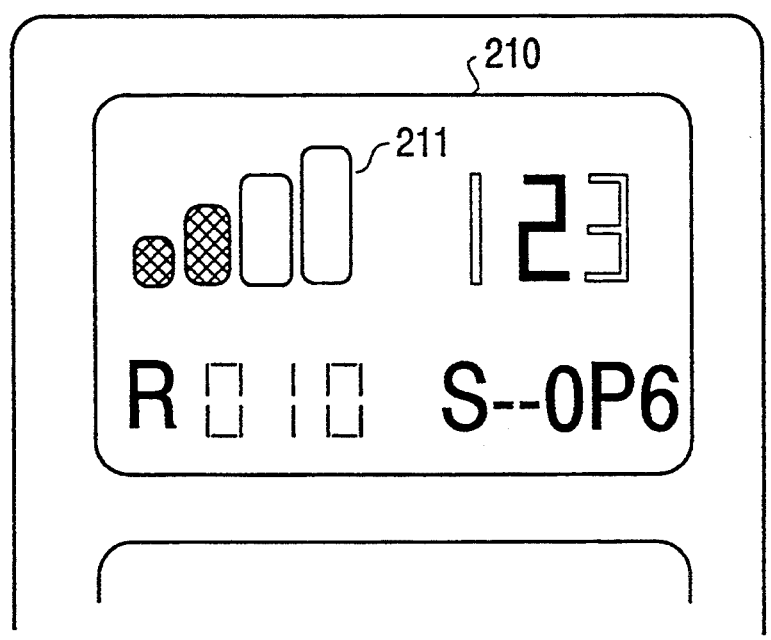
FIG. 9 shows a visual appearance of display unit 210 provided in operational panel 21 shown in FIG. 2.

FIG. 9 shows a visual appearance of display unit 210 provided in operational panel 21. Responsive to the application of the corrected input level: L-av, display unit 210 determines which one of the four levels (as shown 211 in FIG. 9) the L-av corresponds to and drives LCD (Liquid Crystal Display) therein in accordance with the determination.

Also, in the digital mode operation, microprocessor 201 provides the corrected input level: L-av to MOD 7 via I/O interface 202 so that MAHO control signal including the L-av may be transmitted to a base station serving the mobile unit.

It should be noted that since the received signal strength information is not required to be transmitted to a base station in the analog mode operation according to the technical standard, the above mentioned correction operation on the signal strength measured by RSSI 6 may be omitted in the analog mode operation. In this event, the operational steps 404 and 405 in FIG. 4 is skipped.

It should be obvious from the above discussed embodiment that non-linear measurement characteristics of RSSI 6 may be compensated by referring to the conversion table in ROM 23 and RAM 24. Also, since the conversion data are provided for either of the digital mode signals and the analog mode signals in the first and second portion of RAM 24, accurate signal strength measurement may be achieved.

Although the embodiment of the present to a dual mode cellular mobile unit used in a dual mode cellular system have been described above, the present invention may be applied to any kind of radio communication apparatus having a received signal strength measuring function, for example, an analog-only cellular radio telephone, a digital-only cellular radio telephone, or a cordless telephone.

It should be obvious from the above-discussed apparatus embodiment that numerous other variation and modification of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

We claim:

1. A radio communication apparatus for use in a dual mode cellular radio system wherein speech signals are selectively transmitted in an analog mode or a digital mode over a radio link established between a base station and the radio communication apparatus, the radio communication apparatus comprising:

receiving means for receiving radio frequency signals transmitted over the radio link;

measuring means, coupled to the receiving means, for measuring the strength of the radio frequency signals received by the receiving means and outputting an output signal corresponding to the measured strength of the radio frequency signals;

first storing means for storing first conversion data for digital mode signals;

second storing means for storing second conversion data for analog mode signals; and calculating means coupled to the measuring means and selectively coupled to either of the first storing means or the second storing means for calculating a corrected received signal strength on the basis of the output signal and the first conversion data when the apparatus operates in the digital mode and for calculating a corrected received signal strength on the basis of the output signal and the second conversion data when the apparatus operates in the analog mode.

2. The apparatus of claim 1 further comprising display means for providing a display on the basis of the corrected received signal strength.

3. The apparatus of claim 1 further comprising transmitting means coupled to the calculating means for transmitting a control signal including one of the corrected received signal strengths to the base station.

4. A radio communication apparatus for use in a dual mode cellular radio system wherein speech signals are transmitted in one of an analog mode and a digital mode over a radio link established between a base station and the radio communication apparatus, the radio communication apparatus comprising:

receiving means for receiving radio frequency signals transmitted over the radio link;

measuring means, coupled to the receiving means, for measuring the strength of the radio frequency signals received by the receiving means and outputting an output signal corresponding to the measured strength of the radio frequency signals, the measuring means having individual measurement characteristics;

first storing means for storing first conversion data in accordance with the individual measurement characteristics of the measuring means for digital mode signals;

second storing means for storing second conversion data in accordance with the individual measurement characteristics of the measuring means for analog mode signals; and calculating means coupled to the measuring means and selectively coupled to the first and second storing means for calculating a corrected received signal strength on the basis of the output signal and the first conversion data when in digital mode and on the basis of the output signal and the second conversion data when in analog mode.

5. The apparatus of claim 4 further comprising display means coupled to the calculating means for providing a display on the basis of the corrected received signal strength.

6. The apparatus of claim 4 further comprising transmitting means coupled to the calculating means for transmitting a control signal including the corrected received signal strength to the base station.

* * * * *